April 25, 1933.　　　J. P. TARBOX　　　1,905,657
BRAKE COOLING SYSTEM
Filed Jan. 22, 1929
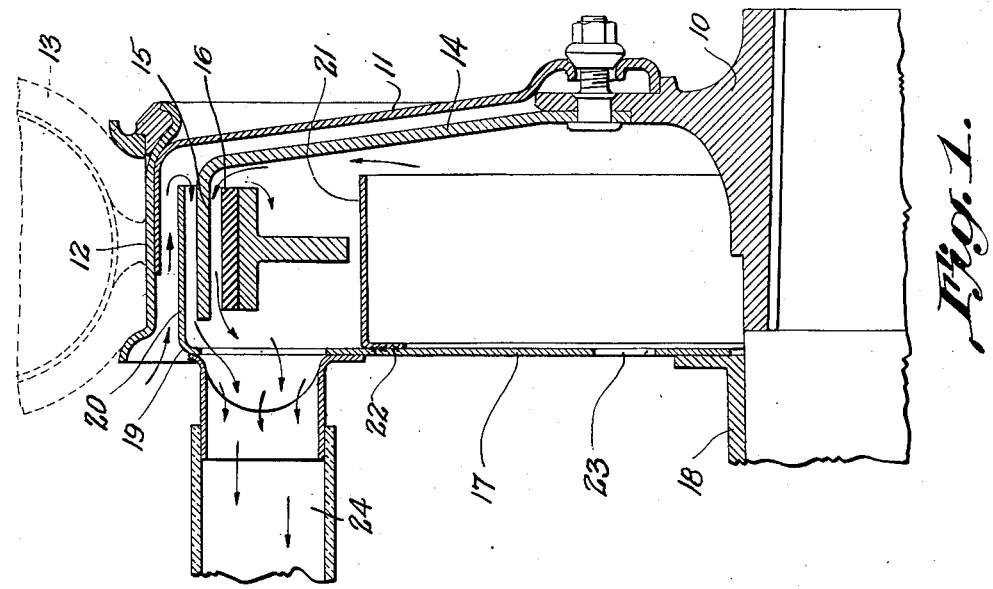
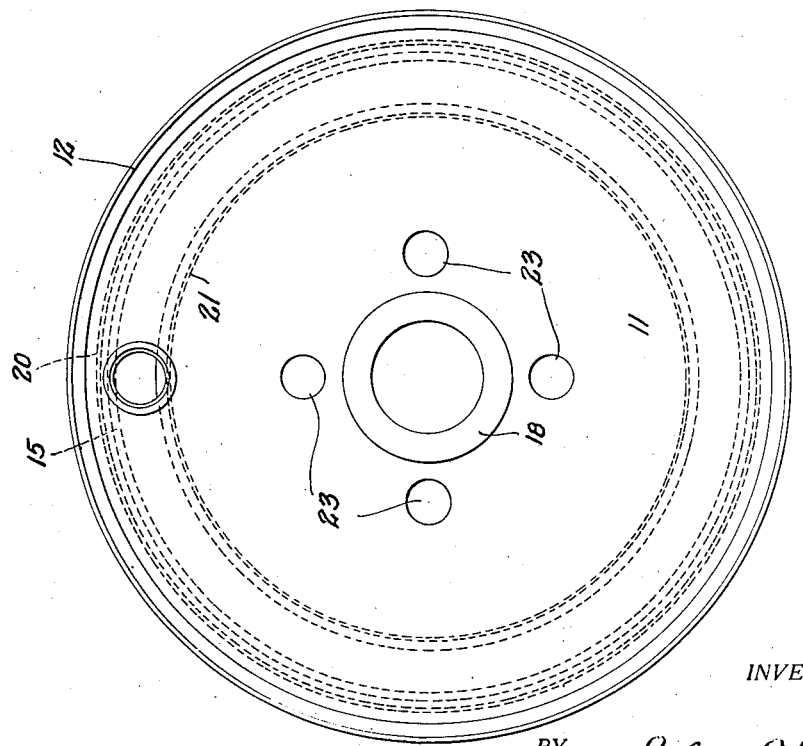
INVENTOR:
BY
ATTORNEY.

Patented Apr. 25, 1933

1,905,657

UNITED STATES PATENT OFFICE

JOHN P. TARBOX, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

BRAKE COOLING SYSTEM

Application filed January 22, 1929. Serial No. 334,238.

This invention relates to a braking system in which there is provided an organization of parts directed especially to an efficient cooling of the braking surfaces at all times by cooling currents of air. It has special reference to the braking systems of automobiles, particularly in busses.

In the operation of busses on certain routes where the stopping is frequent, or where the grades are very great and very frequent, or in sections of the country where the weather is very hot, particularly in large busses, the problem of keeping the brakes cool has been sometimes a serious one. Especially has this been so with vehicles having very large pneumatic tires and in which the diameter of the brake drum therefore approaches very closely the consequently relatively reduced diameter of the rim, for in such cases the extreme heating of the braking surfaces results in heating of the rim and the deterioration of the rubber of the tire in contact with the rim. This is not to mention the impairment of the durability of the braking surfaces themselves and the impairment of the adjustment to the brakes.

There have been numerous inventions directed to the relief of this difficulty, many of them through air circulation. My invention means to remove the difficulties set forth by air circulation, but through a structure so organized that it is at once practically and economically built, involving a very minimum of alteration of standard brake structures, and insures a circulation of air, at very maximum cooling, no matter how the pressure for circulation is derived. More specifically stated, I solve the problem by supporting air current directing flanges from the usual brake cover plate in such arrangement with respect to the brake drum and the brake shoes that air currents are circulated freely on both faces of both the shoe and the brake drum when the brake is off and continuously on the exterior surfaces of the engaging portions of said parts while the brake is on.

In the accompanying drawing I show the form of my invention which is now best known to me. Of the drawing, Fig. 1 is an axial cross section of an automobile wheel in which this system is embodied, Fig. 2 is a side elevation of such a wheel.

As designated, 10 is the hub of the wheel, 11 the body of the wheel, in this case depicted as a disc, 12 is the rim, and 13, shown in dotted lines, the tire. The brake drum 14 is supported from the hub 10 separately from the disc and its braking surface 15 parallels the rim and it is of such diameter that it lies adjacent to the rim 12.

A brake shoe 16 is arranged internally of the drum to internally engage the braking surface 15. The brake mechanism is not shown, but both the brake shoe 16 and the brake mechanism are partially supported and protected from dust, etc. by a brake drum cover plate 17. This plate is secured to a relatively fixed part such as the axle housing 18. Plate 17 ordinarily terminates approximately at the edge 19 of the brake drum 14, but in this case I provide a flange 20 on the periphery of the cover plate and of a depth sufficient to enable it to extend exteriorly of the braking surface 15 and spaced therefrom into close adjacency to the disc 11. Preferably I form this flange integrally with the cover 17, but a separate member may be attached if desired. Interiorly of the braking surface 15 and the brake shoe 16 cover plate 17 supports a second flange 21. This flange is preferably formed separably from the cover plate and welded thereto at a point 22. It extends in close adjacency to the inside of the brake shoe 16 and to the head of the brake drum 14, and is contiguous to the shoe when the brake is off. The relative arrangement of these parts is such that air circulation channels are provided between all of them by means of which air entering or exiting either between rim 12 and flange 20 or between flange 21 and brake drum head 14, or from any point between flanges 20 and 21, will be directed simultaneously between the adjacent surfaces of the flange 20 and the breaking surface 15, of the braking surface 15 and the brake shoe 16, and of the exterior surface of the shoe 16 and the interior surface of the flange 21. One such circulation is indicated by the arrows.

An opening 23 is provided near the axis of the cover plate 17 to insure entrance or exit of air to the interior of drum 11 irrespective of the particular direction of the circulation. Any known means of circulation may be utilized such, for example, as wind vanes, exhaust nozzles or the like, attached and located with respect to the entrance and the exit. In all of them external flanges are carried by the cover plate 17 and constitute internal and external baffle plates which insure the passage of air currents over each and every square inch of radiating surface internally and externally associated with the braking surface 15 and the brake shoe 16. In addition, the baffle plate 20 constitutes an intervened heat shield between the braking surface 15 and the rim 12. Thus the brakes are not only most efficiently cooled at all times, but also what heat there remains is effectually precluded by the baffle plate 20 from reaching the rim 12. In fact, the air current between rim 12 and the baffle 20 takes heat directly from all contiguous surfaces of both the rim 12 and its associated parts and the baffle plate itself.

Any form of pressure or suction device may be applied to the conduit 24 to produce a circulation of air, for example, the exhaust gases of a car engine may be employed for such purposes.

Such is the nature of my invention. I desire to have it understood that in the annexed claims I intend to cover each and all modifications which protect its generic spirit.

What I claim as new and useful and desire to protect by Letters Patent is:—

1. In combination in a braking system, a wheel having a rim, a brake drum interiorly of the rim of the wheel, a brake drum cover plate, and annular transverse baffle flanges carried by the cover plate, one interiorly and one exteriorly of the drum and in spaced relation thereto.

2. In combination in a braking system, a wheel having a rim and a body, a brake drum interiorly of the rim having a head and transversely extending braking surface, a brake drum cover plate and annular transverse baffle flanges carried by the cover plate, one exteriorly of the braking surface and projecting into proximity of the body of the wheel and the other interiorly of the braking surface and projecting in proximity to the head of the brake drum.

3. In combination in a braking system, a wheel having a rim, a brake drum interiorly of the rim, a brake shoe interiorly of the drum, and a brake drum cover plate and annular transverse baffle flanges carried by the cover plate, the one exteriorly of the drum and the other interiorly thereof and in spaced relation thereto, said interiorly carried flange lying substantially contiguous to the inner perimeter of the brake shoe when the brake is off.

4. In combination in a braking system, a wheel having a rim, a brake drum interiorly of the rim of the wheel, a brake drum cover plate, and an annular baffle flange carried by the cover plate exteriorly of the brake drum and in spaced relation thereto.

5. In combination in a braking system, a wheel having a rim, a brake drum surface within the rim, a brake shoe coacting with said surface, a brake cover plate, and an annular baffle flange carried by said cover plate interiorly of the braking shoe and lying substantially contiguous to the shoe when the brake is off.

In testimony whereof I hereunto affix my signature.

JOHN P. TARBOX.